United States Patent [19]

Bampton et al.

[11] Patent Number: 5,745,834
[45] Date of Patent: Apr. 28, 1998

[54] FREE FORM FABRICATION OF METALLIC COMPONENTS

[75] Inventors: Clifford C. Bampton, Thousand Oaks; Robert Burkett, Simi Valley; Hong-Son Ryang, Camarillo, all of Calif.

[73] Assignee: Rockwell International Corporation, Thousand Oaks, Calif.

[21] Appl. No.: 530,770

[22] Filed: Sep. 19, 1995

[51] Int. Cl.$^6$ ........................................ B22F 1/00
[52] U.S. Cl. .............. 419/37; 419/47; 419/49; 419/52; 419/54
[58] Field of Search ................ 419/37, 47, 49, 419/52, 54

[56] References Cited

U.S. PATENT DOCUMENTS

| | | | |
|---|---|---|---|
| 4,855,102 | 8/1989 | Okada | 419/8 |
| 4,927,992 | 5/1990 | Whitlow et al. | 219/121.65 |
| 5,017,753 | 5/1991 | Deckard | 219/121.63 |
| 5,155,324 | 10/1992 | Deckard et al. | 219/121.64 |
| 5,156,697 | 10/1992 | Bourell et al. | 156/62.2 |
| 5,182,170 | 1/1993 | Marcus | 428/551 |
| 5,316,720 | 5/1994 | Spiegel et al. | 419/48 |
| 5,393,482 | 2/1995 | Bend et al. | 419/1 |

OTHER PUBLICATIONS

Carter et al., "Direct Laser Sintering of Metals," *Proc. Solid Freeform Fabrication Conference*, Austin, TX, Aug. 9–11, 1993, pp. 51–59.
König et al., "Rapid Metal Prototyping—New Approaches for Direct Manufacturing of Metallic Parts," *Proc. 27th ISATA*, Aachen, Germany, Oct. 31–Nov. 4, 1994, pp. 281–288.
DT*Monitor*, vol.4, No. 1, Spring/Summer 1994 (newsletter of DTM Corporation, 1611 Headway Circle, Bldg. 2, Austin, TX 78754).

*Primary Examiner*—Charles T. Jordan
*Assistant Examiner*—Anthony R. Chi

[57] ABSTRACT

A method of free form fabrication of metallic components, typically using computer aided design data, comprises selective laser binding and transient liquid sintering of blended powders. The powder blend includes a base metal alloy, a lower melting temperature alloy, and a polymer binder that constitutes approximately 5–15% of the total blend. A preform part is built up, layer-by-layer, by localized laser melting of the polymer constituent, which rapidly resolidifies to bind the metal particles. The binder is eliminated from the preform part by heating in a vacuum furnace at low atmospheric pressure. The preform part may require support during elimination of the polymer binder and subsequent densification by controlled heat treatment. Densification is performed at a temperature above the melting point of the lower temperature alloy but below the melting point of the base metal alloy to produce transient liquid sintering of the part to near full density with desired shape and dimensional tolerances. The densified part may be subjected to a final hot isostatic pressing (HIP) treatment to close residual porosity and complete the chemical homogenization of the part. Elimination of residual porosity improves fatigue properties of part, and homogenization improves ambient temperature ductility, toughness, and high temperature strength. An advantage of the process is rapid production of complex shaped metal prototypes and complete small batch production runs of high cost metal components without special tooling or machining operations.

20 Claims, 1 Drawing Sheet

FREE FORM FABRICATION OF METALLIC COMPONENTS

TECHNICAL FIELD

The present invention relates to methods of free form fabrication and, in particular, to a method of free form fabrication of metallic components using selective laser binding and transient liquid sintering of blended powders.

BACKGROUND OF THE INVENTION

Commercial systems are available for free form fabrication of solid objects in polymeric materials using computer-aided design data. If available, a similar method of free form fabrication of complex shaped metallic components would have utility for rapid production of prototypes and for complete production runs of small batches of high cost components. Previous techniques, however, have not been successfully adapted for direct free form fabrication of metallic components having high strength and structural integrity.

In an attempt to develop a rapid prototyping system for metallic components, two separate alloy powders were used in a process of selective laser sintering (SLS). A single layer of powder having the base alloy composition of the metallic component, such as Haynes 230 superalloy, for example, was spread in a thickness equivalent to 85% of a single layer segment in a two-dimensional laminate component build-up process. A second layer of depressed melting temperature powder, such as Haynes 230 alloy with 3% boron by weight, for example, was spread over the first powder layer to a thickness equivalent to the final 15% of the complete layer of the stereo lithographic segment of the component. The powder layers were pre-heated in an inert environment to a temperature just below the melting temperature of the top powder layer. A sufficiently intense laser beam was focused on selected areas of the top layer to melt the top powder. The liquid metal rapidly wicked into the powder layer immediately below and isothermally solidified as the melting temperature depressant (boron, in this example) diffused out of the liquid phase into the solid powder. This process rapidly produced a nearly fully dense segment of the component. Fresh powder layers were then spread on top and the process repeated to progressively build up the complete solid component layer-by-layer according to computer-aided design data. A final hot isostatic pressure (HIP) treatment was used to close the small amount of isolated porosity.

A limitation of the foregoing process using conventional equipment is that the temperature of the powder bed cannot be raised easily above about 200° C. The laser beam, however, must raise the temperature of the top layer of powder to above its melting point, typically in excess of 1000° C. As a result, the component is subjected to severe temperature gradients that produce residual stresses and distortion of the component as it is being built up.

In an alternative process, a polymer powder was blended with a metal powder. Selective laser sintering, as described above, was then used to melt the polymer powder constituent. The melted polymer bound the metal powder in place, layer-by-layer, to form a solid, but porous object. After the component was heated to burn out the polymer binder, it was subjected to partial (solid state) sintering to impart residual strength to the remaining metal powder for subsequent densification. The partially sintered component was then densified by infiltration with a lower melting point liquid metal (such as copper for a steel powder part, for example) or by hot isostatic pressing (HIP), which required some form of encapsulation to transfer the HIP gas pressure to the porous component. The major problems associated with this method are very low metal density after burnout of the polymer binder, which results in lack of control of part dimensions and shape during final densification by some form of HIP process, and very low strength in components utilizing liquid metal infiltration for final densification. Because of the limitations of these processes, there is a need for new methods of selective laser sintering for free form fabrication of complex shaped metallic components.

SUMMARY OF THE INVENTION

The present invention comprises a method of free form fabrication of metallic components by selective laser sintering (SLS) of blended powders, typically using computer aided design (CAD) data. The blended powder used in the present method comprises a parent or base metal alloy that constitutes approximately 75–85% of the total blend; a lower melting temperature metal powder, typically comprising an alloy of the base metal, that constitutes approximately 5–15% of the total blend; and a polymer binder that constitutes approximately 5–15% of the total blend.

The powder blend may be used in a conventional SLS apparatus to build up a preform part, layer-by-layer, by localized laser melting of the polymer constituent of the powder, which rapidly resolidifies to bind the metal particles of the powder with connecting necks or bridges. In a preferred embodiment, the polymer constituent comprises a fine, high purity, spherical particle nylon powder. After completion of the preform part, the binder is eliminated in a vacuum furnace at elevated temperature and low atmospheric pressure. The polymer sintered powder morphology of the present process provides open, connected pores for easy flow of the polymer vapor to the surface of the preform part without build up of local pockets of vapor pressure that might damage the part.

It is generally necessary to provide support for the preform part during the removal of the polymer binder and the subsequent densification process of transient liquid sintering. Because both the removal of the polymer binder and the creation of a volume of liquid metal (typically about 10–20% by volume) act to temporarily reduce the integral strength of the part, a supporting powder (such as a ceramic powder, for example) may be used to surround and support the part during densification. Preferably, the support powder comprises fine, spherical grains that flow easily and provide continuous support for all regions of the densifying part to prevent cracking or slumping under gravitational forces.

An alternate method of providing support for the preform part is to fabricate preform ("green"; i.e., not densified) support tooling comprising structurally supporting shapes. The green support tooling may be fabricated by SLS at the same time as the preform part by using volumes of the blended powder not needed for the part. If the support tooling requires large volumes of expensive alloy powder, the support tooling can be made in a separate SLS process using less expensive alloy powders. After fabrication, the green support tooling may be sprayed with a fine coating of alumina or yttria powder (for example) to prevent the supporting shapes from adhering to the preform part during the transient liquid sintering densification process. The green tooling, which comprises preform material (i.e., not densified) having substantially the same shrink rate as the preform part, may be placed under and around the part as necessary to provide structural support during the densification process.

The same vacuum furnace used for binder removal is generally be used for transient liquid sintering and densification of the supported part by controlled heat treatment. Controlled heat up rates and isothermal hold times within a narrow temperature range cause transient liquid sintering of the part to near full density with the desired shape and dimensional tolerances. The maximum isothermal hold temperature for the part is above the melting point of the lower temperature alloy but below the melting point of the base metal alloy.

As a final stage, the densified part may be subjected to a hot isostatic pressing (HIP) treatment. HIP treatment may be necessary to close residual porosity and complete the chemical homogenization of the part, particularly with respect to the temperature lowering component of the alloy. Elimination of residual porosity is important to improve fatigue properties of the part, and homogenization of the alloy can improve the properties of ambient temperature ductility, toughness, and high temperature strength.

A principal object of the invention is rapid free form fabrication of metallic components. A feature of the invention is selective laser binding and transient liquid sintering of a powder blend containing a base metal, a lower melting temperature metal, and a polymer binder. An advantage of the invention is rapid production of complex shaped metal prototypes and complete small batch production runs of high cost metal components without the need for tooling or machining.

BRIEF DESCRIPTION OF THE DRAWINGS

For a more complete understanding of the present invention and for further advantages thereof, the following Detailed Description of the Preferred Embodiments makes reference to the accompanying Drawings, in which.

DETAILED DESCRIPTION OF THE PREFERRED EMBODIMENTS

Figure 1:
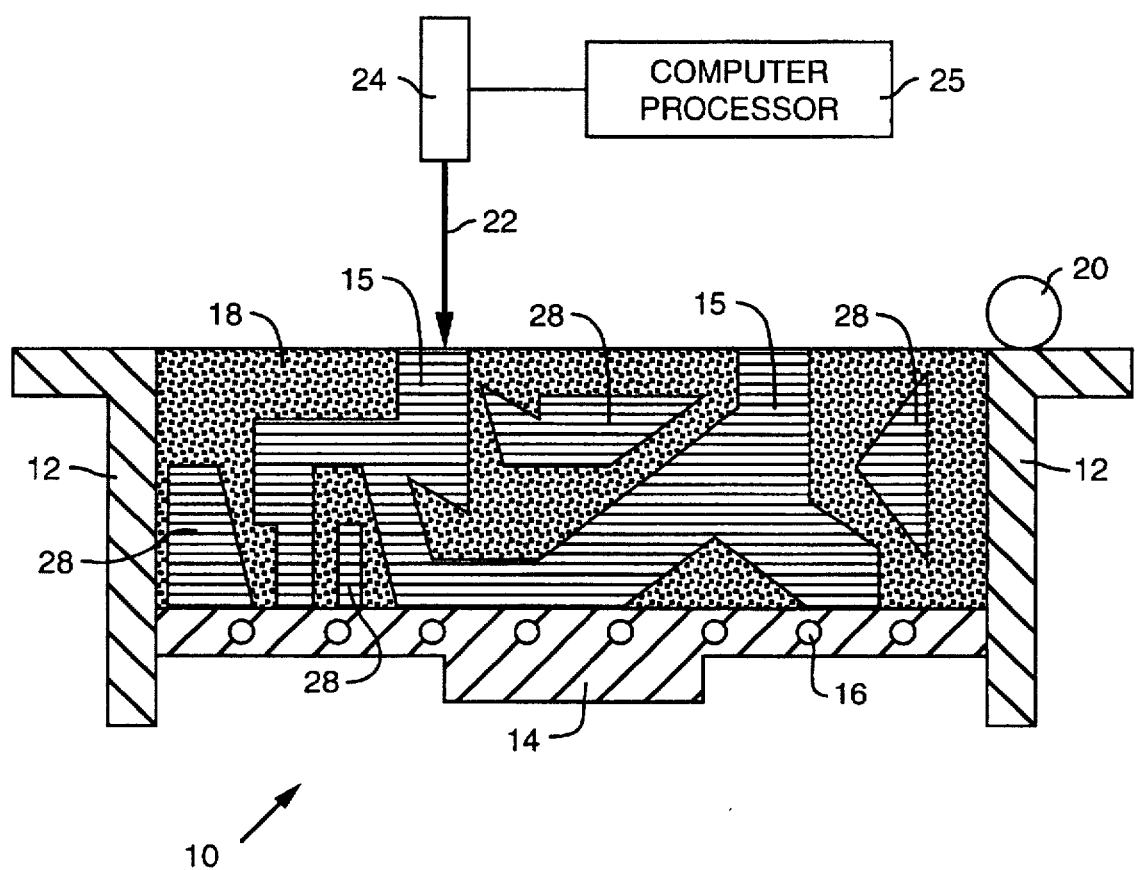
FIG. 1 is a schematic, cross-sectional side view of a selective laser sintering (SLS) apparatus as used in performing the method of the present invention.

The present invention comprises a method of free form fabrication of metallic components by selective laser binding and transient liquid sintering of blended powders. The method, which may use computer aided design data directly from a computer processor, has utility for rapid production of complex shaped metal prototypes and for complete small batch production runs of high cost components or dies without the need for special tooling or machining operations.

In preparation for selective laser sintering (SLS) as modified in the present method, three powders are blended together. One powder comprises the desired parent or base metal alloy, such as nickel-based Haynes 230 superalloy, as an example, that constitutes approximately 75–85% (preferably about 82%) of the total powder blend. The base metal may be selected from metallic elements, such as nickel, iron, cobalt, copper, tungsten, molybdenum, rhenium, titanium, and aluminum, for example, that can be formed into suitable powders and subsequently densified by a transient liquid sintering process. A second powder, which constitutes approximately 5–15% (preferably about 10%) of the total blend, generally comprises the same base metal alloy as the first powder but with a sufficient amount of an alloying element, such as boron (typically about 3–4%), for example, added to lower the melting point of the alloy by at least about 200° C., and preferably by 300°–400° C. Other alloying elements that may be used as melting point depressants include, for example, silicon, carbon, phosphorus, and a large number of metallic elements that form low melting point eutectic compositions with the various base metals described above (such as magnesium with aluminum, for example). The average particle size of the metal powders is generally in the range of about 1–55 μm (preferably in the range of about 25–55 μm), and may be specified as –325 mesh, for example. A third powder, which constitutes approximately 5–15% (preferably about 8%) of the total blend, comprises a polymer binder. The average particle size of the polymer binder powder is generally in the range of 1–50 μm (preferably in the range of about 3–8 μm). It should be noted that the present process is applicable to other materials and compositions, and one skilled in the art will understand that the alloys, blend percentages, and temperatures described herein are presented as examples and not limitations of the present invention.

The selective laser sintering process of the present invention is illustrated schematically in FIG. 1, which shows a side cross-sectional view of an SLS apparatus 10 and a part 15 undergoing fabrication. SLS apparatus 10 includes side walls 12 and a platform or table 14. Table 14 may be heated with coils 16, for example, embedded in table 14. Table 14 may be constructed to descend incrementally within walls 12 to form a cavity for containing a powder 18 to be sintered. A means 20 may be positioned on apparatus 10 for spreading measured layers of powder 18 atop table 14 within the sintering cavity.

Powder 18, which comprises a three-part blend as described above, is used in the present process to build up a preform shape of the desired part 15. Means 20 may be used to spread a thin layer (approximately 0.001" to 0.020", for example) of powder 18 atop table 14, which is initially positioned just below the top of walls 12. Table 14 may be heated with coils 16 to bring the temperature of blended powder 18 to a desired level below the melting point of the polymer binder constituent. A beam 22 from a laser 24 is scanned over the layer of blended powder 18, typically as directed by a computer processor 25 having computer aided design (CAD) data for part 15, to perform selective laser sintering of powder 18. The function of beam 22 is to provide precise, localized heating of powder 18. Preferably, beam 22 is provided by a laser in the infrared or near infrared region, although any focused beam of energy that is sufficiently intense to generate precise, localized heating may be used. Thus, the SLS process causes localized melting of the polymer constituent of the layer of blended powder 18 as it is scanned by laser beam 22. The melted polymer rapidly resolidifies to bind the metal constituents of powder 18 with connecting necks or bridges between metal particles. After laser beam 22 has completed its scan, table 14 is lowered a predetermined increment, a new layer of powder 18 is spread atop the previous layer, and the SLS process is repeated to build up part 15 layer-by-layer according to the design plan provided by computer processor 25.

An important aspect of the present invention, compared to conventional SLS of 100% polymer powders, is the use of a relatively small volume fraction of polymer binder (about 5–15%, for example) in blended powder 18. In a preferred embodiment, the polymer constituent of blended powder 18 comprises a fine, high purity, spherical particle nylon powder having an average particle size in the range of approximately 3–8 μm. Blended powder 18, formulated as described above, has the following attributes: (1) excellent flow characteristics in SLS apparatus 10; (2) excellent laser sintering characteristics, with less thermal distortion and higher repeatability between builds compared with conventional 100% polymer powders (resulting from higher thermal conductivity of the metal content of blended powder 18); (3) high metal volume fraction in the "green" preform part (i.e., prior to densification) resulting from the low volume fraction of polymer binder, excellent powder flow characteristics, and high tap-density provided by an all-spherical, controlled size distribution powder blend; and (4) high dimensional tolerance, surface finish, and robustness of the polymer bound preform part 15 due to the strong bridging behavior of the liquid polymer binder between metal particles under natural surface tension forces.

After completion of the final layer of laser sintering, built-up preform part 15 is removed from SLS apparatus 10. Elimination of the polymer binder constituent from preform part 15 may be achieved by placing part 15 in a vacuum furnace at elevated temperature (about 300°–500° C., for example) and low atmospheric pressure. The use of a low volume fraction of the preferred high purity nylon binder has the advantages of (a) very low contamination of the base metal from binder residue (mainly carbon) due to high purity of the initial nylon powder, and (b) relatively rapid outgassing with minimal physical damage to porous preform part 15 due to the low volume fraction of nylon and its preferential location as bridges across metal particle contact points. Thus, the polymer sintered powder morphology of the present process provides open, connected pores for easy flow of the nylon vapor to the surface of preform part 15 during the vacuum furnace outgassing process without build up of local pockets of vapor pressure that could damage preform part 15.

It is generally necessary to provide support for part 15 during the elimination of the polymer binder component and the subsequent transient liquid sintering densification process (further described below). Both the removal of the polymer binder and the creation of a volume of liquid metal (typically about 10–20% by volume) act to temporarily reduce the integral strength of part 15. To provide support, a support powder may be used to surround preform part 15 during the densification process. Examples of suitable support powders for part 15 include ceramic powders, such as yttria, zirconia, silicon nitride, and boron nitride, and metal powders having a ceramic surface coating, such as nickel aluminide (Ni$_3$Al) powder with a nitrided surface, for example.

Preferably, the supporting powder comprises fine, spherical grains to flow easily, ensure uniform heating during densification, and provide continuous support for all regions to prevent cracking or slumping of part 15 under gravitational forces. The supporting powder should possess sufficient thermal conductivity to provide uniform heating, be non-reactive with metal part 15, and be non-agglomerating at the temperatures required for the transient liquid sintering process. Non-uniform heating of part 15 can cause cracking due to unequal shrinkage during the densification process. Agglomeration can cause excess support powder to become trapped in cavities and result in stress cracking of densifying part 15.

Uniform heat transfer and sustained support for densifying part 15 can be enhanced by providing the support powder in a gently fluidized bed, which can be produced by either a mechanical stirring action or a recirculating gas. A recirculating gas should be selected so as to not hinder (and preferably to enhance) the transient liquid sintering process. As compared to a vacuum environment, a gas mixture of methane, hydrogen, and nitrogen, for example, will enhance the sintering rate and increase the hardness of a ferrous or nickel alloy part. An ideal powder for a fluidized medium is a material with a similar or slightly lower density than that of the part to be heat treated in the transient liquid sintering process. A fluidized heat treatment bed for a nickel or steel alloy part, for example, can be provided by a nickel aluminide powder that has been treated to provide a thick surface nitride coating on the nickel aluminide powder particles.

An alternate method of providing support for preform part 15 is to fabricate preform ("green") support tooling (i.e., structurally supporting shapes), illustrated in FIG. 1 as shapes 28. Green support shapes 28 may be fabricated by SLS at the same time as preform part 15 by using volumes of blended powder 18 not needed for part 15. If powder 18 comprises an expensive alloy powder and the support tooling requires large volumes, the support tooling can be made in a separate SLS process using a less expensive alloy powder. After fabrication and removal from apparatus 10, the green support shapes 28 may be sprayed with a fine coating of a release agent, such as alumina or yttria powder, for example, to prevent supporting shapes 28 from adhering to preform part 15 during the transient liquid sintering densification process. The green shapes 28, which comprise material having the same shrink rate as the preform part (or substantially the same shrink rate if a less expensive alloy is used), are placed under and around part 15 as necessary to provide structural support during the densification process.

Preferably, the lower melting temperature constituent of the metal powder blend is prealloyed with the base alloy composition so as to melt quickly and uniformly when the liquid phase sintering temperature is exceeded. Elemental powders of a melting point depressant material generally do not provide sufficiently rapid melting. Prealloyed low melting temperature powders having an alloy composition different from the base alloy composition generally produce a non-homogeneous composition and microstructure in the densified part, resulting in poor mechanical properties. Preferably, the low melting temperature constituent is in the form of a separate powder with particle size similar to that of the base metal powder so that the two metal powders may be blended efficiently by conventional mechanical mixing techniques, and the surface contact area between the base metal powder and the lower melting temperature powder is minimized to reduce interdiffusion and ensure effective melting at the transient liquid sintering temperature. Use of a base metal powder with a coating of the lower melting temperature constituent is less effective because the larger contact area of the powder coating (as compared with discrete powder particles) allows excessive interdiffusion and dilution of the melting point lowering element prior to reaching the transient liquid sintering temperature.

The same vacuum furnace used for eliminating the polymer binder may be used for transient liquid sintering and densification of part 15 by controlled heat treatment. Specific heat up rates and isothermal hold times within a narrow temperature range cause transient liquid sintering of part 15 to near full density with sufficiently controlled and repeatable shrinkage to produce desired shape and dimensional tolerances for net-shape part 15. The critical material constituent for this stage of the process is the lower melting temperature powder, which typically comprises the base metal alloy (about 5–15% of the total volume) with an alloying addition (such as about 3–4% boron, for example) to lower the melting point of the base alloy by approximately 300°–400° C. The maximum isothermal hold temperature for transient liquid sintering of part 15 is above the melting point of the lower temperature (e.g., borided) alloy but below the melting point of the base metal alloy. Advantages of using a lower melting temperature alloy for liquid phase sintering (compared to liquid phase sintering of the base metal alloy alone) include the following: (1) only about 5–15% of the total metal powder melts so that collapse of fragile elements of the part under gravity is less likely (compared to the case of liquid phase sintering of the base metal alone, where all of the powder particles are partially melted); (2) sintering occurs at approximately 200°–400° C. lower than the melting point of the base metal alone, which provides a superior microstructure (compared to the undesirable microstructural coarsening in unmelted base metal at the higher temperatures) and has significant economic benefits with respect to furnace equipment; and (3) resolidification (in the borided case) is by isothermal dilution of boron in the liquid (i.e., by diffusion of boron into the solid base metal powder particles), which results in a rapid rise in melting point (whereas resolidification of the base metal alone occurs only by lowering the furnace temperature). The isothermal solidification process inherent in the borided case results in a superior microstructure because there are no temperature gradients to cause undesirable solute segregation during solidification.

During the densification process described above, it may be advisable to place preform part 15 and green support shapes 28 on a smooth, low friction plate comprising a material such as boron nitride or machined graphite, for example. The use of a low friction plate allows part 15 (and support shapes 28) to shrink uniformly at top and bottom, thereby eliminating any distortion that might otherwise arise from gravitational and frictional constraints acting on the bottom surface.

Although the foregoing densification stage of the process generally provides a fully dense part 15, in some cases it may be desirable to include a final hot isostatic pressing (HIP) treatment. HIP treatment may be necessary to close residual porosity and complete chemical homogenization of the part, particularly with respect to the temperature lowering component of the alloy (e.g., boron). Elimination of residual porosity is important to improve fatigue properties of part 15. Homogenization of the boron content can improve the properties of ambient temperature ductility, toughness, and high temperature strength.

In some applications of the process, it may be desirable to limit the volume of transient liquid in the densification stage. This might be desirable to minimize gravitational slumping during transient liquid sintering or to reduce overall boron content for improved mechanical properties. When limiting the volume of transient liquid, however, a significant amount of residual, isolated porosity can be expected. In this case, a final HIP treatment may be necessary to optimize final mechanical properties of part 15. Nevertheless, using a temperature lowering alloy for transient liquid sintering, when compared with direct, solid state HIP consolidation treatment of the preform (green) part, provides the following advantages: (1) HIP tooling or bagging is not required because residual porosity is isolated and not surface connected (thus allowing part complexity and features, such as surface connected internal channels and cavities, that are not producible in a monolithic part by any other method); and (2) the transient liquid wets all base metal powder particles, effectively scrubbing off surface oxides and other contaminants prior to resolidification. The elimination of particle surface oxides and contaminants is beneficial because their presence generally causes significant reduction of fatigue and fracture properties in directly HIP treated powders.

Although the present invention has been described with respect to specific embodiments thereof, various changes and modifications can be carried out by those skilled in the art without departing from the scope of the invention. Therefore, it is intended that the present invention encompass such changes and modifications as fall within the scope of the appended claims.

We claim:

1. A method of selective sintering of a powder, comprising the steps of:

mixing powders of a base metal, a lower melting temperature metal, and a polymer binder to form a powder blend;

spreading a layer of said powder blend on a platform;

directing a beam of energy onto selected areas of said layer of said powder blend to melt said polymer binder, said polymer binder resolidifying to bind said metal powders in said selected areas; and heating said selected areas of bound metal powders to eliminate said polymer binder and to densify said selected areas by transient liquid sintering and isothermal resolidification at a temperature sufficient to melt said lower melting temperature powder but not said base metal powder.

2. The method of claim 1, further comprising the step of repeating said steps of spreading said powder blend and directing said energy beam onto selected areas layer-by-layer to build up a preform part of bound powders.

3. The method of claim 2, wherein said heating step comprises heating said preform part to vaporize and eliminate said polymer binder and to densify said preform part.

4. The method of claim 3, further comprising the step of supporting said preform part during said heating step in a bed of support powder selected from the group consisting of ceramic powders and ceramic coated metal powders.

5. The method of claim 4, wherein said step of supporting said preform part in a bed of support powder includes selecting said support powder from the group consisting of yttria, zirconia, silicon nitride, boron nitride, and surface nitrided nickel aluminide powders.

6. The method of claim 4, wherein said step of supporting said preform part in a bed of support powder includes the step of providing a fluidized bed of support powder.

7. The method of claim 3, further comprising the steps of:

providing preform support shapes;

coating said preform support shapes with a release agent; and positioning said coated preform support shapes to support said preform part during said heating step.

8. The method of claim 7, further comprising the step of placing said preform part and support shapes on a low friction plate during said heating step.

9. The method of claim 3, further comprising the step of hot isostatic pressing said densified part to close residual porosity and complete chemical homogenization of said part.

10. The method of claim 1, wherein said polymer binder comprises high purity nylon in the form of fine spherical particles.

11. A method of free form fabrication of metallic components, comprising the steps of:

blending powders of a base metal, a lower melting temperature metal, and a polymer binder to form a powder blend;

spreading a layer of said powder blend on a platform;

directing a beam of energy onto selected areas of said layer of blended powder to cause localized melting of said polymer binder, said polymer binder resolidifying to bind said metal powders in said selected areas;

repeating said steps of spreading said powder blend and directing said energy beam onto selected areas to build up a preform part of bound powders;

providing support for said preform part;

heating said preform part to vaporize and eliminate said polymer binder from said preform part; and densifying said preform part by transient liquid sintering and isothermal resolidification at a temperature sufficient to melt said lower melting temperature powder but not said base metal powder.

12. The method of claim 11, further comprising the step of hot isostatic pressing said densified part to close residual porosity and complete chemical homogenization of said part.

13. The method of claim 11, wherein said step of providing support comprises supporting said preform part in a bed of support powder selected from the group consisting of ceramic powders and ceramic coated metal powders.

14. The method of claim 13, wherein said step of supporting said preform part in a bed of support powder includes the step of providing a fluidized bed of support powder.

15. The method of claim 13, wherein said step of providing support further comprises the steps of:

providing preform support shapes;

coating said preform support shapes with a release agent; and positioning said coated preform support shapes to support said preform part during said heating and densifying steps.

16. The method of claim 11, wherein said polymer binder comprises a high purity nylon powder comprising fine spherical particles.

17. A method of free form fabrication of metallic components, comprising the steps of:

forming a powder blend comprising powders of a base metal, a lower melting temperature alloy of said base metal, and a high purity nylon binder comprising fine spherical particles;

spreading a layer of said powder blend on a platform;

directing a laser beam onto selected areas of said layer of blended powder to cause localized melting of said nylon binder, said melted nylon binder resolidifying to bind said metal powders in said selected areas;

repeating said steps of spreading said powder blend and directing said laser beam onto selected areas to build up a preform part of bound powders;

providing support for said preform part;

heating said preform part to vaporize and eliminate said nylon binder from said preform part; and densifying said supported preform part by transient liquid sintering and isothermal resolidification at a temperature sufficient to melt said lower melting temperature alloy powder but not said base metal powder.

18. The method of claim 17, further comprising the step of hot isostatic pressing said densified part to close residual porosity and complete chemical homogenization of said part.

19. The method of claim 17, wherein said step of providing support comprises supporting said preform part in a bed of powder selected from the group consisting of ceramic coated metal powders and yttria, zirconia, silicon nitride, and surface nitrided nickel aluminide powders.

20. The method of claim 19, wherein said step of providing support further comprises the steps of:

providing preform support shapes;

coating said preform support shapes with a release agent; and positioning said coated preform support shapes to support said preform part on a low-friction plate during said heating and densifying steps.

* * * * *